Nov. 16, 1965 D. A. WEINSTEIN 3,218,633

DATA CONVERTER

Filed June 12, 1963 4 Sheets-Sheet 1

INVENTOR
DAVID A. WEINSTEIN
BY Frederick [illegible]
ATTORNEY

DAVID A. WEINSTEIN
INVENTOR
BY [signature]
ATTORNEY

Nov. 16, 1965 D. A. WEINSTEIN 3,218,633

DATA CONVERTER

Filed June 12, 1963 4 Sheets-Sheet 3

DAVID A. WEINSTEIN
INVENTOR

BY Frederick J. Smyth
ATTORNEY

DAVID A. WEINSTEIN
INVENTOR
BY [signature]
ATTORNEY

United States Patent Office 3,218,633
Patented Nov. 16, 1965

3,218,633

DATA CONVERTER

David A. Weinstein, El Sobrante, Calif., assignor to General Precision, Inc., Binghamton, N.Y., a corporation of Delaware Filed June 12, 1963, Ser. No. 287,241
10 Claims. (Cl. 340—347)

This invention relates to a data converter and more particularly to an improved analog to digital converter.

Since the recent application of large scale digital computers to the field of industrial controls, it has generally been necessary to employ one or more analog to digital converters, in order to provide the required digital input signals for the computer. This results from the fact that most industrial measurements are generated in the form of electrical analog signals by such devices as thermocouples and pressure, r.p.m., position, flow rate, etc. transducers.

Therefore, according to the prior art, there has been provided a large number and variety of such analog to digital converters or encoders. Briefly, these encoders are classified into two major groups. The first group includes those analog to digital converters wherein the physical position of a shaft or the like is proportional to the analog input signal and the digital signal corresponding thereto is generated either by brushes in contact with a disk having conducting and insulating segments or by photocells together with a disk having transparent and apoque segments thereon. The second group includes the completely electronic encoders. This second group of analog to digital converters is generally further subdivided into two classes, the first being identified as a ramp type encoder and the second being identified as a comparison type. A ramp type encoder provides a sawtooth waveform, the start of which operates an electronic gate which thereupon permits a series of clock pulses to be delivered to a counter. When the amplitude of the sawtooth waveform is equal in magnitude to the input analog signal, the gate is closed, and the readout of the counter provides the desired digital signal. The comparison type encoder includes a digital register, the output of which is converted to an analog signal which is then compared in magnitude with the input analog signal, the difference therebetween being employed to properly adjust the count in the register. At the conclusion of a sequence of comparison operations, the digital value stored in the register is equal to the input analog signal within a predetermined tolerance.

According to the present invention, there is provided an improved comparison type analog to digital converter which, while possessing general utility, is particularly adapted for industrial installations, especially when it is necessary to keep maintenance and adjustment times to a minimum. The converter, as will be understood as the description proceeds, is readily adapted to provide the required digital output in any selected code such as, by way of example, binary, binary coded decimal, octal, two-out-of-five, as well as any of the various error checking codes. Further, the invention includes an improved digital to analog converter, employing a constant current source, to generate the known analog signal from the register output, all as more particularly hereinafter described.

An object of the invention, therefore, is to provide a data converter.

Another object of the invention is to provide an improved analog to digital converter.

A further object of the invention is to provide an analog to digital converter suitable for industrial installations.

Yet another object of the invention is to provide an analog to digital converter which is readily adaptable to provide an output signal in any desired digital code.

Still another object of the invention is to provide an improved comparison type digital converter incorporating a constant current source for generating the necessary comparison feedback voltage.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

The analog to digital converter of the present invention is readily adaptable for use with a large variety of systems, as will be understood as the description proceeds. However, the converter has primary utility in those systems wherein analog data is assembled at a number of remote stations and thereafter digitally conveyed to a central station at which the combined data is monitored, indicated, and/or recorded. Such a system is described in copending application Serial No. 100,920, filed April 5, 1961 on behalf of Bernard T. Wilson et al., and assigned to the assignee of this invention. As there disclosed, a plurality of field stations are provided, each of which includes a number of transducers installed at various locations therein. A central station is operable to first transmit a digital coded address to all of the field stations. The proper field station, as selected by the address, then sequentially transmits to the central station, digital code groups representative of the outputs of the transducers installed thereat.

The central station is next effective, upon receipt of the digital data transmitted by the selected field station, to display the decimal value of each of the transducers, or, alternatively, to merely indicate that the transducer output is or is not within predetermined limits. The above briefly summerized system has particular utility in the petroleum industry field wherein a number of storage tanks are assembled at several remote locations, and it is desired to determine, at a central station, the quantity and condition of the petroleum stored in each of the plurality of tanks. Due to the fact that a majority of the transducers installed at the field stations provide an electrical analog signal representative of the specific quantity being measured, it is necessary that at least one analog to digital converter be included at each field station in order to obtain the required digitally coded signals accepted by the central station. Further, since the transducer information from each field station is serially transmitted to the central station, it is feasible to employ only a single analog to digital converter at each field station, the various analog transducer outputs being applied thereto through a conventional multiplexer unit. It should be noted, and this is an important feature of the present invention, that in order to obtain economical and efficient operation of such a system, the analog to digital converter installed at each field station should operate without any adjustments, such as zero balance or the like, and, further, the maintenance of the encoder should be kept to a minimum, all as provided by the present invention.

Figures 1, 2:
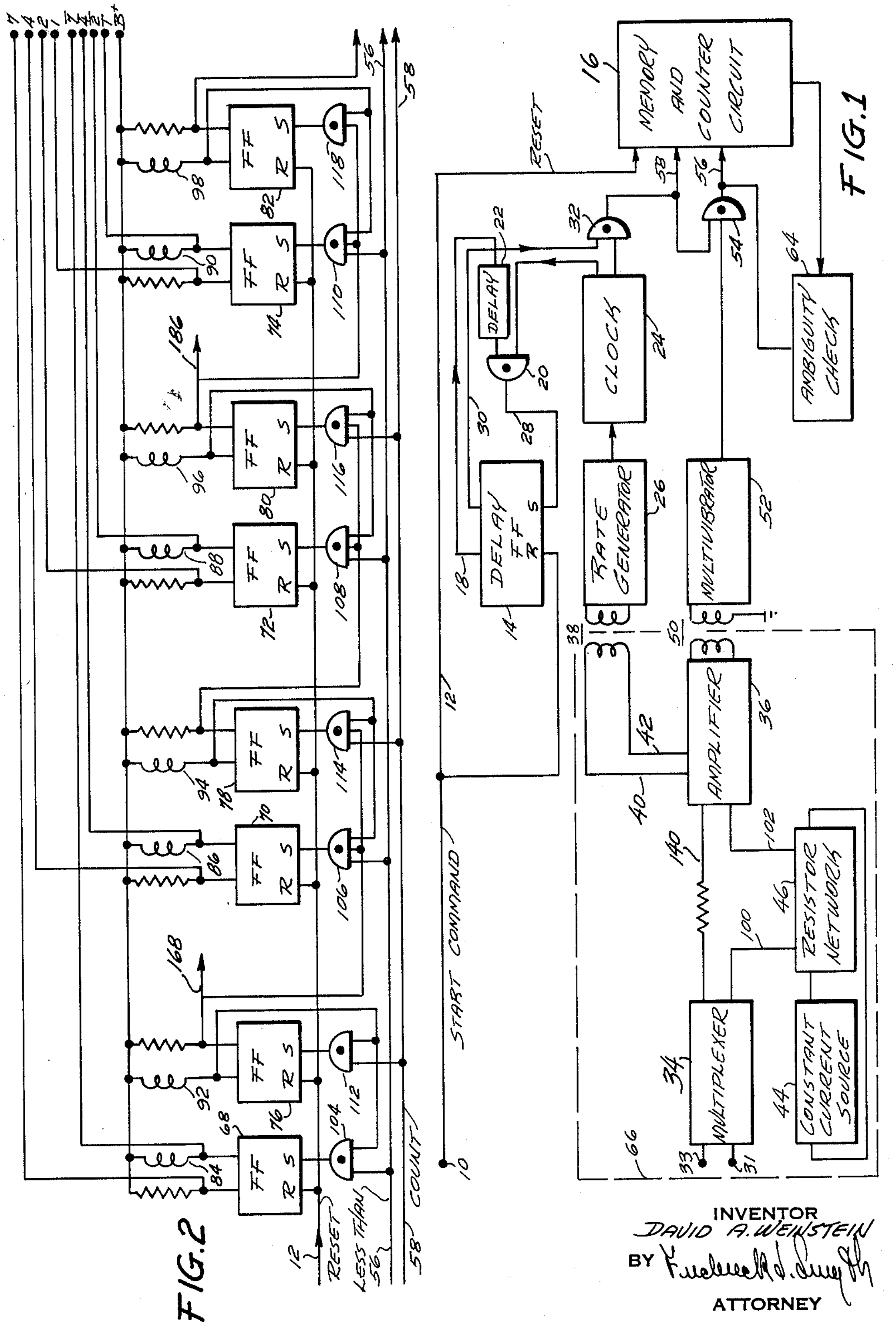
FIG. 1 is a functional block diagram of a preferred embodiment of the apparatus of the invention.
FIG. 2 is a schematic diagram of a portion of the memory and counter circuit illustrated in FIG. 1.

Referring now to the drawings, FIG. 1 illustrates a block diagram of a preferred embodiment of the analog to digital converter of the invention. As there shown, a start command signal, applied to a terminal 10, is effective by means of a line 12 to both reset a delay flip-flop 14 to the OFF condition and to reset all of the flip-flops, to be hereinafter described, of a memory and counter circuit 16 to the OFF condition. The now energized OFF output line 18 of flip-flop 14 is applied to an AND circuit 20 through a delay unit 22. Another input to AND circuit 20 is provided by a clock pulse generator 24 controlled by a rate generator 26. After a predetermined time interval, under control of delay unit 22, which is provided to ensure that all of the flip-flops of memory and counter circuit 16 have been reset, the next clock pulse applied to AND circuit 20 is effective to energize an output line 28 to thereby set flip-flop 18 to the ON condition. A now energized output line 30 connected to flip-flop 18 is effective to condition an AND circuit 32 to initiate a coversion cycle as will be understood as the description proceeds.

The analog input signals to be converted are connected to one pair of input terminals of a multiplexer 34 such as those indicated on 31 and 33, it being understood that a number of like terminal pairs are generally provided. The particular unknown analog signal to be converted is selected by multiplexer 34 and fed to a chopper stabilized amplifier 36, the excitation of the chopper being provided by rate generator 26, transformer 38, and lines 40 and 42. Note should be made of the fact, and this is an important feature of the invention, that connected between multiplexer 34 and amplifier 36 is a known analog voltage generated by current from a constant current source 44 flowing through a resistor network 46. The value of the known analog voltage is controlled by the digital value stored in the memory portion of unit 16 in a novel manner to be hereinafter described, and is sequentially adjusted to be equal to, but opposite in polarity, to the unknown analog input signal. Thus, at this time, the input applied to amplifier 36 is essentially zero, indicating that the digital value stored in unit 16 corresponds in value to the input analog signal.

During the time intervals, however, when the known and unknown analog signals are not equal, the difference therebetween is applied to amplifier 36, wherein it is first modulated at a frequency determined by rate generator 26, and then amplified to a level sufficient to operate the remaining circuitry. The output of amplifier 36 is coupled to the primary of a transformer 50, the secondary of which is applied to the set input of a monostable multivibrator 52. The output of multivibrator 52 is then employed, in conjunction with a clock pulse from clock 24, to adjust the digital value stored in memory 16 by means of an AND circuit 54 and a line 56. By way of example, during those time intervals when the applied unknown analog signal exceeds the magnitude of the known analog signal, a negative signal is applied to multivibrator 52, which is ineffective to set multivibrator 52 to the ON condition, thereby preventing a signal from appearing on line 56. The absence of a signal on line 56 at this time causes the value stored in memory 16 to remain unchanged. Simultaneously, however, a clock pulse is coupled through AND circuit 32 to a line 58, which is effective to increase, by a predetermined amount, the value stored in memory 16. Conversely, during those time intervals when the applied unknown analog signal is less than the magnitude of the known analog signal, a positive signal is applied to multivibrator 52, which is now effective to momentarily set the multivibrator to the ON condition, thereby providing a signal on line 56 which operates to reduce the digital value in memory 16 by a predetermined amount. Again, by means of clock 24 and AND circuit 32, line 58 is energized to increase the digital value stored in memory 16. Due to the fact that the decrease provided by the energization of line 56 is greater than the increase provided by the energization of line 58, the resultant digital value is less than that previously stored in memory 16, thereby providing a new known analog voltage which more nearly approximates the unknown analog signal, all as will better be understood as the description proceeds.

An ambiguity check circuit 64 is provided to prevent the possibility of setting up invalid codes in memory 16 when digital codes other than true binary are employed. The operation of check circuit 64 will be hereinafter explained in conjunction with a specific embodiment of the invention. Further, in accordance with the practice well known in the art, the low level stages of the embodiment of the invention illustrated in FIG. 1 are shielded, as indicated by a dashed line 66, and operated "floating" with respect to ground in order to minimize cross-talk and unwanted ground currents.

Referring now to FIG. 2, there is illustrated a portion of memory and counter circuit 16. As there shown, four flip-flops, 68, 70, 72 and 74, indicate the value of a decimal digit in 7421 binary code, it being understood that a similar series of flip-flops are employed for each less significant decimal digit in the overall decimal number. Further, associated with each binary flip-flop is a counter flip-flop, 76, 78, 80, and 82, which is effective to direct the signals appearing on lines 56 and 58 to the proper memory and counter flip-flop, respectively.

At the commencement of a conversion operation, all of the memory and counter flip-flops are reset to the OFF condition, as explained above with respect to FIG. 1. Under this condition, the armatures of memory relays 84, 86, 88, and 90 are deenergized and the armatures of counter relays 92, 94, 96, and 98 are energized. This selective energization and deenergization of the memory and counter relays is effective to provide a known analog voltage from resistor network 46 along lines 100 and 102 (see FIG. 1) in a manner which will be described in detail as the description proceeds. This known analog voltage is connected in series with the unknown analog signal present at the output of multiplexer 34, and the difference therebetween is applied to amplifier 36. If the unknown analog signal is greater than the known analog voltage, the output of amplifier 36, coupled through transformer 50 does not trigger multivibrator 52, and no signal, therefore, is present on line 56. However, if the unknown analog signal is less than the known voltage, the output of amplifier 36 is now effective to trigger monostable multivibrator 52, and, by means of AND circuit 32 together with a pulse from clock generator 24, to thereby energize line 56.

Referring again now to FIG. 2, line 56 is parallelly connected to AND circuits 104, 106, 108, and 110, each of which connected in series with the set input of one of the memory flip-flops. As shown, another input for each of the AND circuits is connected to the OFF output line of the associated counter flip-flop. Additionally, AND circuits 106, 108, and 110 are further coupled to the ON output line of the immediately preceding counter flip-flop. Thus, at this time, which corresponds to the first comparison between the magnitudes of the known and unknown analog signals, the energization of line 56 is effective to set only flip-flop 68 to the ON condition, since AND circuits 106, 108, and 110 are blocked by the deenergized ON output line of the preceding counter flip-flop. The setting of flip-flop 68 to the ON condition is effective to energize relay 84 and thereby decrease the magnitude of the known analog voltage by a predetermined amount.

Independent of whether or not line 56 was energized during this clock pulse period, it should be noted (see FIG. 1) that line 58 is energized during every clock pulse period. As shown in FIG. 2, line 58 is parallelly connected to AND circuits 112, 114, 116, and 118, each of which is connected in series with the set input of one of the counter flip-flops. Another input for each of the flip-flops is connected to the OFF output line of the counter flip-flop with which it is associated. Additionally, AND circuits 114, 116, and 118 are further coupled to the ON output line of the immediately preceding counter flip-flop. It can be seen, therefore, that each memory flip-flop together with its associated counter flip-flop are simultaneously conditioned to be responsive to the energization of lines 56 and 58, respectively, and, further, that only one such pair of AND circuits are conditioned during any one clock pulse period. Additionally, each pair of flip-flops is conditioned in sequence, that is, subsequent to the adjustment of the known analog voltage, under control of AND circuits 14 and 112 by way of example, during one time interval, AND circuits 104 and 112 are then deconditioned by the now deenergized reset output line of counter flip-flop 76. Simultaneously, however, AND circuits 106 and 114 are conditioned both by the now energized set output line of flip-flop 76 and the energized reset output line of flip-flop 78. In a similar manner, each succeeding pair of flip-flops are sequentially energized after each comparison operation under control of clock 24, which may better be understood now with respect to FIG. 3.

Figure 3:
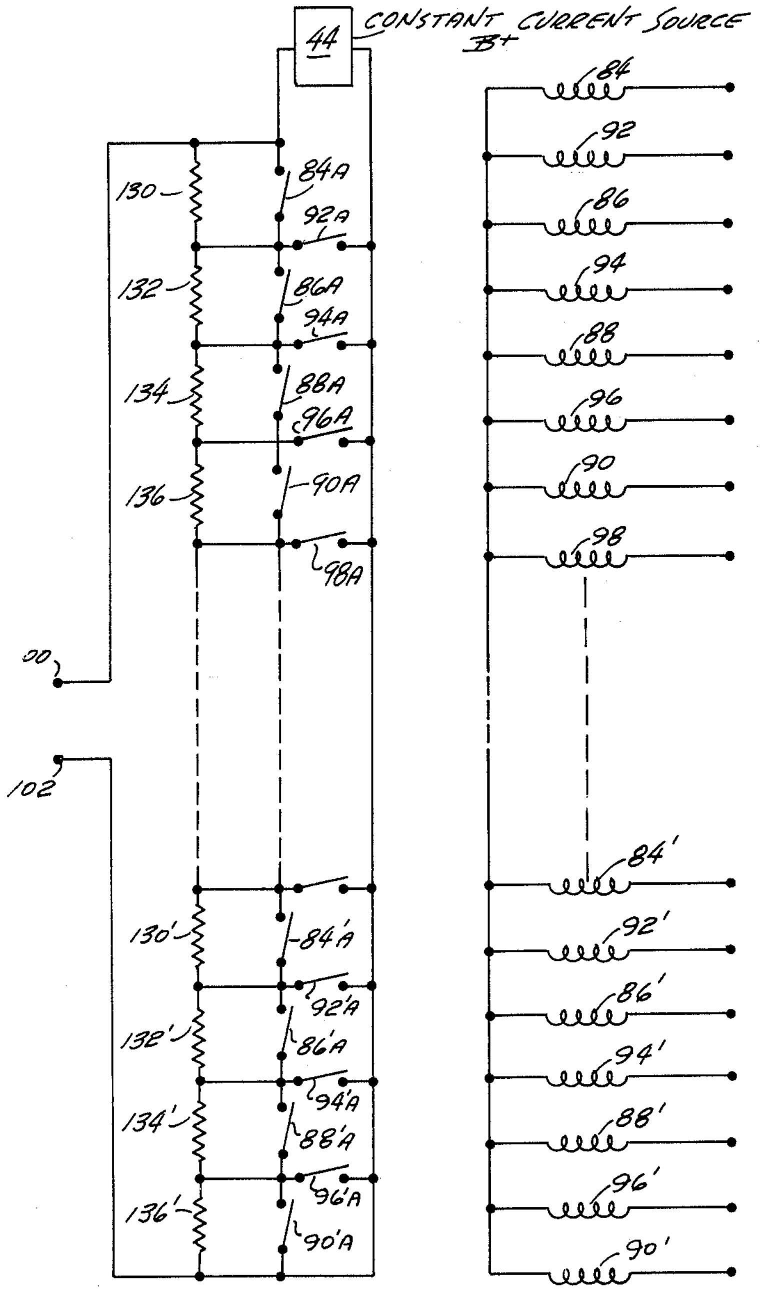
FIG. 3 is a schematic diagram of a portion of the resistor network illustrated in FIG. 1.

As illustrated in FIG. 3, the known analog voltage provided on lines 100 and 102 is generated by current flow from source 44 through one or more of the serially connected resistors 130, 132, 134, 136, 130′, 132′, 134′ and 136′. For reasons of clarity, the memory and counter relays shown in FIG. 2 have been redrawn adjacent their associated contacts, and, further, as an aid in understanding this portion of the operation of the invention, an additional group of relays, numbered similarly as those above described, differing only through the addition of primes, has been added, to indicate a lesser significant decimal digit, the connecting dashed lines being employed to indicate that additional significant decimal digits can be interposed therebetween, if desired.

At the start of an analog to digital conversion operation, all of the memory relays 84, 86, etc. are deenergized, while each of the counter relays 92, 94, etc. are energized, as a result of a reset signal along line 12 as hereinbefore described. As shown in FIG. 3, this results in resistor 130, only, being connected in circuit with source 44, the remaining resistors being effectively bypassed by the now closed contact 92A of counter relay 92. As a specific example, with the magnitude of the unknown analog signal limited to a maximum of ten volts, a constant circuit of one milliampere is provided by source 44, in order to aid in generating the digital value of the unknown analog signal in conventional 7421 code, and resistor 130 is selected to have a value of seven thousand ohms, resistor 132 a value of four thousand ohms and resistors 134 and 136 a value of two thousand ohms and one thousand ohms, respectively. The corresponding resistors associated with each of the lessor significant decimal digits are similarly proportioned, merely being reduced by a factor of ten, in dependent order of significance of each decimal digit.

Therefore, in the specific example now being described, the known analog voltage is initially seven volts. If the unknown analog signal is less than this value, relay 84 is energized by flip-flop 68 (see FIG. 2) and contact 84A thereof is effective to remove resistor 130 from the circuit in series with source 44. Conversely, if the unknown analog signal is greater than seven volts, relay 84 is not energized, and resistor 130 remains in the circuit. Simultaneously, with this first comparison, relay 92 is deenergized to thereby connect resistor 132 in the series circuit. Thus, at the end of the initial clock pulse period, the known analog voltage is either four volts, as a result of current flow through resistor 132 only, when the unknown analog signal is less than seven volts, or the known analog voltage is eleven volts, as a results of current flow through resistors 130 and 132, when the unknown analog signal is greater than seven volts.

During the next subsequent clock pulse interval, a further comparison operation is performed. If the known analog voltage at this time is eleven volts, relay 86 will be energized to remove resistor 132 from the circuit, since, in the present example, the unknown analog signal is limited to ten volts and therefore is necessarily less than the known voltage. Aternatively, as hereinafter more particularly described, ambiguity check circuit 64 (FIG. 1) is operable to prevent a 7–4 output combination being generated in any decimal digit, since this is one of the forbidden combinations in the conventional 7241 binary code. Additionally, if the known analog voltage is four volts, relay 86 is either energized or remains deenergized depending on whether or not the unknown analog signal is less than or greater than four volts, respectively. Simultaneously, during this clock pulse interval, relay 94 is energized to insert resistor 134 into the series circuit in order to provide a new known analog voltage for the comparison to be performed during the next clock pulse interval Thereafter in similar fashion, each of the resistors 130 through 136′ are selectively inserted in circuit with source 44 to develop a voltage, and by means of a comparison operation to modify this voltage so that it is equal, but opposite in polarity, to the unknown analog signal. At the end of a comcycle, that is, after resistor 136′ has been inserted in the circuit by relay 96′, and either removed therefrom by the energization of relay 90′ if the unknown analog signal is less than the known analog voltage, or not removed if the unknown analog signal is greater than or equal to the known analog voltage, it can be seen that the resistors remaining effective in resistor network 46 have been determined by the state of the memory flip-flops 68, 70, etc. Now, as shown in FIG. 2, the state of each memory flip-flop is sampled to provide the required digital output. Note should be made of the fact, and this is an important feature of the invention, that although the converter has been illustrated as providing a 7421 binary coded output, the circuit is readily adaptable to provide any desired output binary code such as, by way of example, the well-known 8421, 2421, and 5421 codes, as well as the pure binary code, merely by appropriately scaling the values of the resistors within resistor network 46. Thus, by changing resistor network 46, the converter is readily adaptable to provide a digital output in any selected digital code. Further, since all of the resistors of network 46 are mountable upon a pluggable module, it should be apparent that the flexibility of the digital output code is achieved in an extremely economical and efficient manner.

Figure 4:
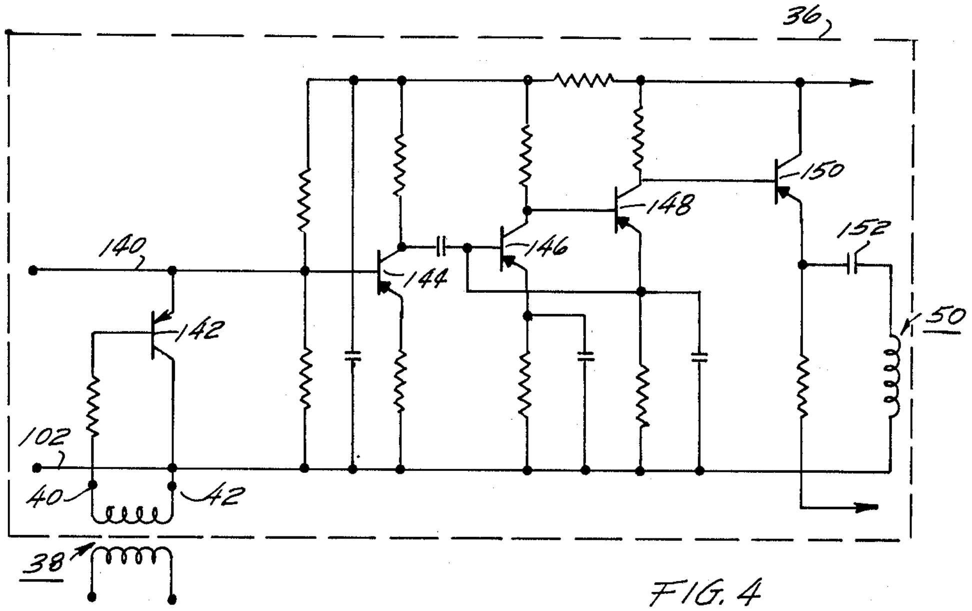
FIG. 4 is a schematic diagram of the amplifier illustrated in FIG. 1.

Referring now to FIG. 4, there is illustrated a schematic diagram of amplifier 36. As there shown, the difference signal, if any, between the unknown analog signal applied to terminals 31 and 33 and the known analog voltage developed by current flow from source 44 through network 46 (see FIG. 1), is applied to the input terminals of amplifier 36 along lines 102 and 140. A transistor, 142, is positioned across the input terminals of the amplifier with the collector thereof connected to line 102 and the emitter connected to line 140. Transistor 142 is effective, in conjunction with rate generator 26, transformer 38, and lines 40 and 42 connected to the base and collector of transistor 142, respectively, to alternately present a relatively high impedance and a relatively low impedance between lines 102 and 140. In this manner, transistor 142 operates to modulate, or "chop," the difference signal applied to amplifier 36 to convert the essentially D.C. signal, resulting from the fact that rate generator 26 normally operates at a frequency which is high compared to the rate of change of the unknown analog signal, into an A.C. signal. Thus, under control of generator 26, at the start of each clock pulse time interval, transistor 142 applies a step function to the remaining portion of amplifier 36 which includes a high gain A.C. amplifier comprising transistors 144, 146, and 148, and emitter follower 150. This step function results from the conversion of transistor 142 from the low impedance state, which effectively short circuits the difference signal applied by lines 102 and 140, to the high impedance state.

The output of emitter follower 150 is coupled through a capacitor 152 to the primary winding of transformer 50, the secondary of which is coupled to one shot multivibrator 36 as hereinabove described. It should be noted that other and different amplifiers may be substituted for the amplifier shown in FIG. 4, including but not limited to, a D.C. differential amplifier.

Figure 5:
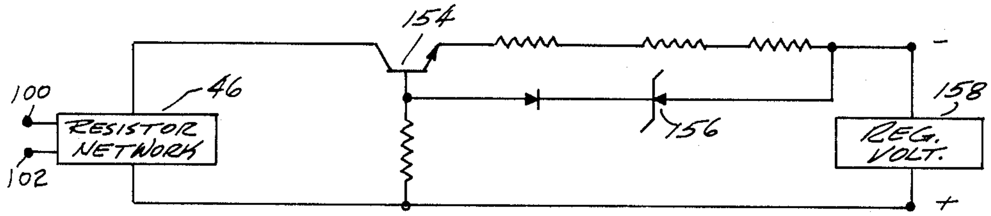
FIG. 5 is a schematic diagram of the constant current source illustrated in FIG. 1.

FIG. 5 is a schematic diagram of constant current source 44. As shown, the stable, low-drift source includes, basically, a transistor 154, a reference Zener diode 156, and a regulated voltage source 158. Diode 156 and source 158 coact to maintain the base of transistor 154 clamped, resulting in a constant collector current. It should be noted, that in a similar manner as with amplifier 36, other and different constant current sources may be substituted for the source illustrated in FIG. 5, it being emphasized that the stability of the current source employed directly effects the overall analog to digital conversion accuracy, since, as should now be understood, the magnitude of the current provided by source 44 generates, in conjunction with resistor network 46, the known analog voltage.

Figure 6:
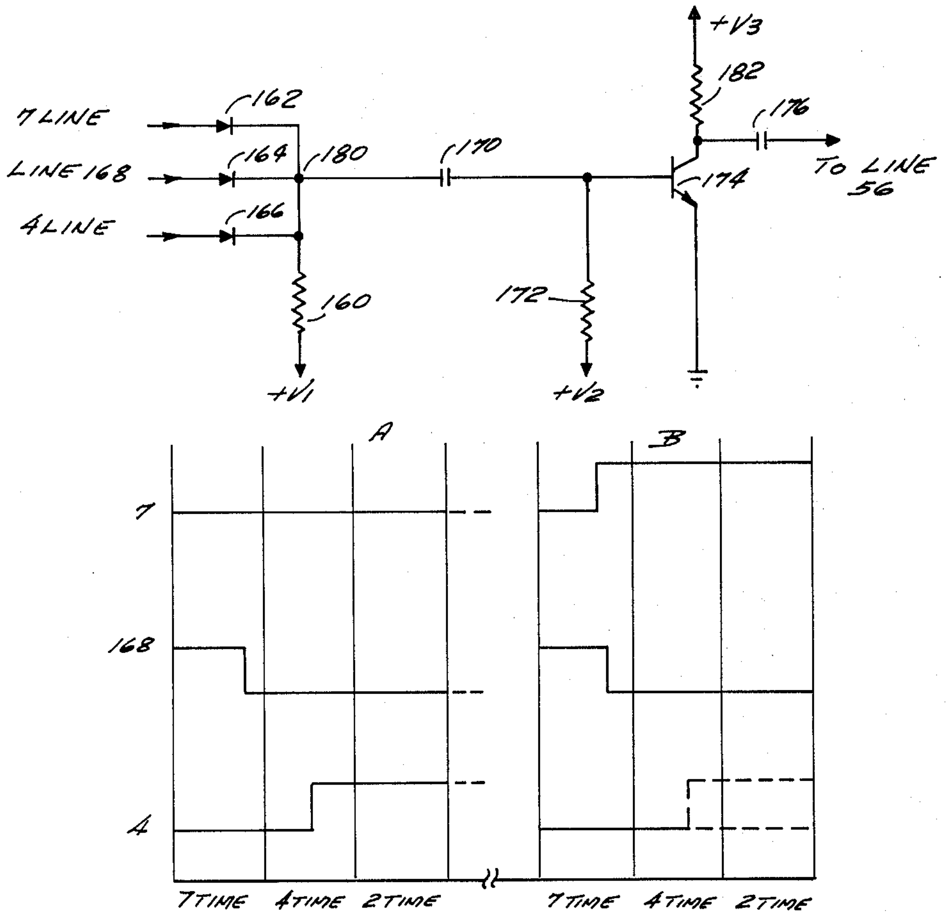
FIG. 6 is a schematic diagram of a portion of the ambiguity check circuit illustrated in FIG. 1.

Referring now to FIG. 6, there is illustrated a schematic diagram of a portion of ambiguity check circuit 64 of FIG. 1, which may be employed to prevent the generation of invalid codes, when output signals in other than pure binary form are provided by the converter of the instant invention. As described above with reference to FIG. 2, the preferred embodiment of the converter provides the digital output in the conventional 7421 binary code, as listed below in Table I:

*Table I*

| Digital Value | Weighted Output | | | |
|---|---|---|---|---|
| | 7 | 4 | 2 | 1 |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 1 | 0 | 0 | 0 |
| 8 | 1 | 0 | 0 | 1 |
| 9 | 1 | 0 | 1 | 0 |

Note that in the above table, the value 7 might be designated by only the weighted stage 7 being in the ON state as shown, or, alternatively, stages 4, 2, and 1 might be in the ON state. For the reason that it is often desirable to convert 7421 code to the two-out-of-five 74210 check code, it is preferable, as hereinafter explained, to indicate the value 7 by only setting weighted stage 7 to the ON state, the output 421 thereupon being an invalid or forbidden code. Additionally, output code 74 is forbidden, in the 7421 code, since its weighted value is greater than 9. All of the forbidden output combinational codes, which of course vary widely with both each specific overall system as well as with the particular code involved, are easily prevented from occurring, by energizing line 56 to automatically set the next memory flip-flop to zero by check circuit 64, whenever circuit 64 senses that forbidden code might be set up.

FIG. 6 discloses one particular example of ambiguity check circuit 64, extensions therefrom being in part obvious, and in part described, operable to prevent the forbidden code 74 from being generated. As shown, an AND circuit including a resistor 160, and a group of diodes 162, 164, and 166 is coupled to selected points of memory and counter circuit shown in FIG. 2. Specifically, diode 162 is connected to the 7 output line, diode 164 is connected by a line 168 to the ON output of counter flip-flop 76, and diode 166 is connected to the 4 output line, it being understood that the connections are made through buffer and/or isolation stages as necessary. The output of diodes 162, 164, and 166 are coupled through an integrator circuit including a capacitor 170 and a resistor 172, to the base of a normally conducting transistor 174, the output of which is coupled to line 56 by a capacitor 176.

The operation of the circuit is best explained in conjunction with the curves also illustrated in FIG. 6, wherein the A group of curves indicates the operation when the 7 output line remains energized at the end of the 7 comparison clock pulse time interval, labelled 7 time in the figure, and the B group of curves indicates the circuit operation when the 7 output line is deenergized during 7 time.

As hereinabove described, both the 7 and 4 lines are energized, and line 168 is deenergized at the start of a conversion operation under control of the start command signal applied along reset line 12. Thus, at this time, diode 164 conducts and maintains a junction 180 connecting the cathodes of diodes 162, 164, and 166 at the B+ potential. As shown in the curves of group A, during 7 time, the 7 line remains energized as a result of the comparison performed during this clock pulse time interval, and the 4 line remains energized since its associated AND circuit 106 (see FIG. 2) is not conditioned. However, line 168 is switched to the energized state, and the coincidence of the simultaneously energized 7 and 4 line 168 is effective to interrupt the conduction of all diodes in the AND circuit, causing the potential at point 180 to decrease to the potential V1. This negative going waveform is differentiated by capacitor 170 and resistor 172, in order to ensure the generation of an output pulse of sufficient time duration, and applied to the base of transistor 174. This negative pulse is effective to block conduction through the transistor, thereby coupling a positive pulse, developed across a load resistor 182, through capacitor 176 to line 56, and thence through the now conditioned AND circuit 106 to the set input of flip-flop 70 to deenergize the 4 output line. Note that the now deenergized 4 line permits diode 166 to conduct, thereby maintaining junction 180 at B+ potential and removing the effect of this portion of ambiguity check circuit 64 during the remainder of conversion operation.

Alternatively, the deenergization of the 7 output line during 7 time, causes diode 162 to conduct and clamp junction 180 to the B+ potential. Thus, the later energization of line 168 is ineffective to generate an output pulse from the portion of the ambiguity check circuit shown in FIG. 6.

It should now be obvious that by various input line combinations applied to one or more AND circuits similar to that shown in FIG. 6, any desired forbidden code can be prevented. By way of example, the above mentioned 421 combination can be prevented by connecting the 4 and 2 output lines together with the set output of flip-flop 80, by means of a line 186 coupled thereto, to a corresponding AND circuit, thereby generating an output pulse which is effective to set the 1 output line to the deenergized condition. Further, when binary coded decimal 8421 weighing is used, the conditions for preventing a forbidden output are satisfied if the 4 and 2 output lines are deenergized when the 8 output line remains energized at the termination of the 8 comparison time interval.

It should be noted that, and this is another important feature of the invention, each of the various portions of the check circuit are readily mounted on pluggable modules, thus various forbidden code combinations can quickly be interchanged. This important feature is further emphasized by considering that the output digital code is selected by the scaling of the resistors in resistor unit 44, and, therefore, the mutual substitution of selected pluggable units is effective to alter the digital output code and the associated forbidden codes, all in a matter of minutes without requiring any major circuit changes.

As indicated above, and especially with respect to the above identified application, it is often desirable to change a 7421 code to a 74210 check code, the latter of which is shown in Table II.

*Table II*

| Digital Value | Weighted Output | | | | |
|---|---|---|---|---|---|
| | 7 | 4 | 2 | 1 | 0 |
| 0 | 1 | 1 | 0 | 0 | 0 |
| 1 | 0 | 0 | 0 | 1 | 1 |
| 2 | 0 | 0 | 1 | 0 | 1 |
| 3 | 0 | 0 | 1 | 1 | 0 |
| 4 | 0 | 1 | 0 | 0 | 1 |
| 5 | 0 | 1 | 0 | 1 | 0 |
| 6 | 0 | 1 | 1 | 0 | 0 |
| 7 | 1 | 0 | 0 | 0 | 1 |
| 8 | 1 | 0 | 0 | 1 | 0 |
| 9 | 1 | 0 | 1 | 0 | 0 |

A comparison between Tables I and II indicate that in order to convert from the 7421 code to the 74210 code, it is necessary to energize the 0 output line when only a single one of the 7421 output lines is energized, and that the digital value 0 is indicated by the energization of the 7 and 4 output lines. Elementary circuits for performing this conversion are next briefly described, reference being made to copending application Serial No. 306,551, filed September 4, 1963 on behalf of John Scarbrough et al. and assigned to the assignee of this invention, which provides this and other features.

Figure 7:
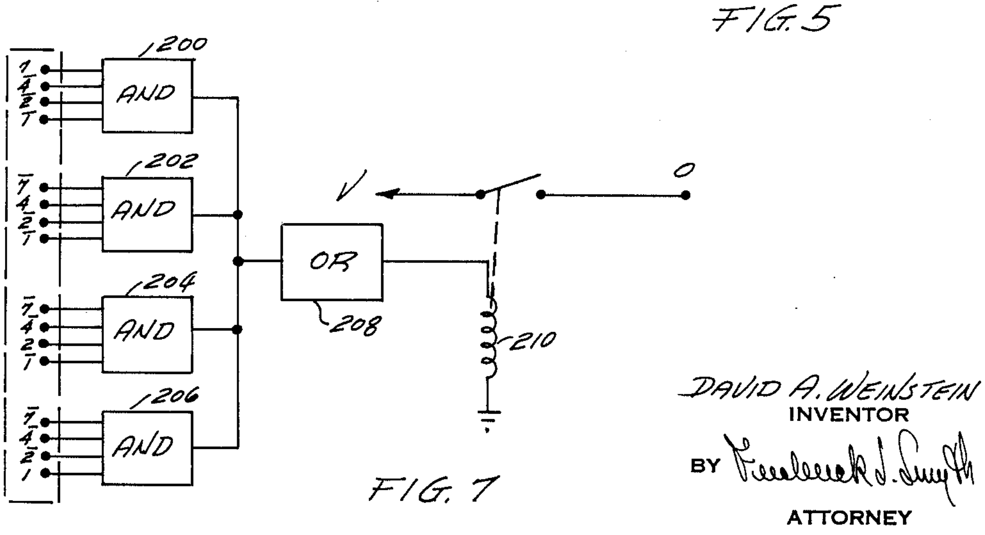
FIGS. 7 and 8 are schematic diagrams of further circuits which may be employed in a specific embodiment of the apparatus of the invention.

In order to energize a 0 output line when only one of the 7421 output lines are energized, the circuit illustrated in FIG. 7 may be employed. As there shown, four, four-input AND circuits 200, 202, 204, and 206 are coupled to combinations of the set and reset outputs of the memory flip-flops of FIG. 2, such that AND circuit 200 provides an output when the 7 output line, only, is energized, AND circuit 202 provides an output when the 4 output line, only, is energized, etc. The outputs of the four AND circuits are combined together in an OR circuit 208 to control the operation of a relay 210. Thus, the energization of only one of the 7421 output lines is effective to actuate relay 210 to thereby additionally energize the 0 output line. Note should be made of the fact that, since the resetting of the memory flip-flops in the circuits of FIG. 2 at the start of a conversion operation energizes each of the 7421 output lines, the circuit of FIG. 7 remains inoperative at least until the complete conversion of the decimal digit with which it is associated.

Figure 8:
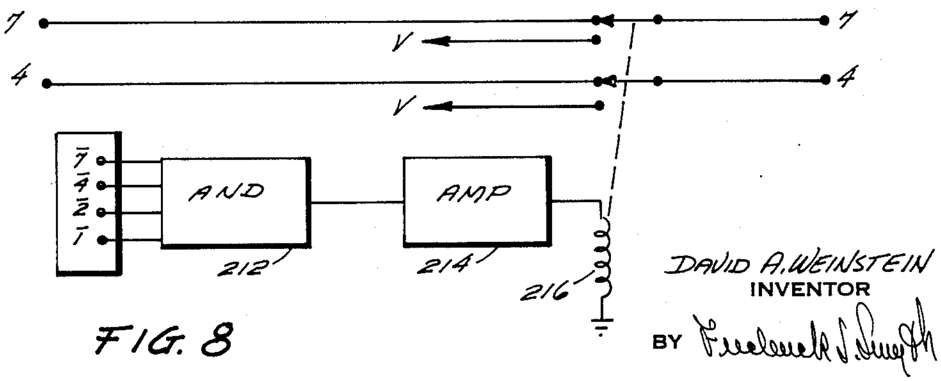

Turning now to FIG. 8, there is illustrated a circuit which may be employed to selectively energize the 74 output lines, when the converted digital value is zero, in accordance with Table II. As there shown, an AND circuit 212 is coupled to the $\overline{7}$, $\overline{4}$, $\overline{2}$, $\overline{1}$ output lines which are individually connected to the set output lines of the memory flip-flops of the circuit of FIG. 2. The simultaneous energization of these four lines, indicative of digital value of zero, results in an output signal from AND circuit 212, which is first amplified by an amplifier 214, if required, and then is effective to actuate a relay 216. The transfer of the contracts associated therewith, normally in series with the 7 and 4 output lines, results in the energization of the 7 and 4 output lines representative of a zero in the 74210 code.

What has been described is an improved analog to digital converter which is especially suitable for use in industrial installations, requiring a minimum of maintenance and adjustment time. Further, by means of the novel circuitry employed, there is provided extreme flexibility both as to the type of digital output code developed, as well as to the particular code combinations forbidden.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. An analog to digital converter comprising, (a) an analog input signal;

(b) a digital register for storing digital numbers;

(c) a constant current source;

(d) a plurality of resistors;

(e) first circuit means electrically connecting all of said plurality of resistors and said current source in series;

(f) second circuit means coupled to said digital register and responsive to the digital number stored therein for removing selected ones of said plurality of resistors from said series connection to provide a known analog voltage commensurate with the value of said digital number;

(g) third circuit means electrically connecting said analog input signal and said known analog voltage in series to provide a difference signal when the magnitudes of said signals are unequal;

(h) fourth circuit means responsive to said difference signal and operable to decrease the magnitude of said number stored in said register during each of a sequence of time intervals only when said difference signal is of a first polarity; and (i) fifth circuit means operable during each of said sequence of time intervals to increase the magnitude of said number stored in said register.

2. The converter of claim 1 wherein the relative values of each of said plurality of resistors determines the binary code of the numbers stored in said digital register.

3. The converter of claim 1 wherein the decrease of the magnitude of said number stored in said register responsive to said fourth circuit means is greater than the increase in the magnitude of said number stored in said register responsive to said fifth circuit means.

4. The converter of claim 1 wherein said register comprises, (a) a plurality of serially connected stages, each of said stages including a memory flip-flop and a counter flip-flop wherein the ON state of each of said flip-flops is controlled by an AND circuit;

(b) sixth circuit means coupling said fourth circuit means to all of said AND circuits controlling the ON state of said memory flip-flops;

(c) seventh circuit means coupling said fifth circuit means to all of said AND circuits controlling the ON state of said counter flip-flops; and (d) eighth circuit means coupling the ON output to each of said counter flip-flops to the AND circuits controlling the ON state of the next succeeding memory and counter flip-flops in said serially connected stages.

5. The converter of claim 4 including, (a) means for resetting all of said memory and counter flip-flops to the OFF conditions prior to a conversion operation; and (b) means responsive to said last named means for inhibiting said fourth and fifth circuit means for a predetermined time interval.

6. An analog to digital converter comprising, (a) an unknown analog signal;
(b) a digital register for storing digital numbers;
(c) a constant current source;
(d) a plurality of resistors;
(e) first circuit means electrically connecting all of said resistors and said source in series;
(f) second circiut means coupled to said digital register and responsive to the digital number stored therein for removing selected ones of said plurality of resistors from said series connection to provide a known analog voltage commensurate with the value of said digital number;
(g) third circuit means electrically connecting said analog signal and said known analog voltage in series to provide a difference signal when the magnitudes of said analog signal and said known analog voltage are unequal,
(h) means responsive to said difference signal and said second circuit means to remove a further one of said resistors from said series circuit during each of a sequence of time intervals only when said difference signal is of a first polarity; and
(i) fourth circuit means operable during each of said sequence of time intervals to insert another one of said resistors in said series connection.

7. An analog to digital converter comprising, (a) an unknown analog signal the magnitude of which is to be converted to digital data;
(b) a digital register for storing digital data in a sequence of weighted binary bits;
(c) means coupled to said digital register including a constant current source and a selectable plurality of resistors electrically connected in series therewith and operable in accordance with the digital data stored in said register to provide a known analog voltage commensurate with said stored digital data;
(d) means connecting said unknown analog signal and said known analog voltage electrically in series to provide a difference signal;
(e) means responsive to said last named means to decrease the magnitude of the data stored in said register when the magnitude of said unknown analog signal is less than the magnitude of said known analog signal; and
(f) further means operable to decrease the magnitude of the data stored in said register when a predetermined value is stored in said register.

8. An analog to digital converter comprising;

(a) an analog input signal;
(b) a digital register for storing digital number in a weighted binary code;
(c) a constant current source;
(d) a first plurality of resistors;
(e) first circuit means electrically connecting all of said plurality of resistors and said current source in series;
(f) second circuit means coupled to said digital register and responsive to the digital number stored therein for removing selected ones of said plurality of resistors from said series connection to provide a known analog voltage commensurate with the value of said digital number;
(g) third circuit means electrically connecting said analog input signal and said known analog voltage in series to provide a difference signal when the magnitudes of said signals are unequal;
(h) fourth circuit means responsive to said difference signal and operable to decrease the magnitude of said number stored in said register during each of a sequence of time intervals only when said difference signal is of a first polarity;
(i) a second plurality of resistors; and
(j) means for substituting said second plurality of resistors for said first plurality of resistors to thereafter alter the weighted binary code of said numbers stored in said register in response to said fourth circuit means.

9. The converter of claim 8 wherein said first plurality of resistors is scaled in the ratio 7–4–2–1 for each decimal digit of said digital number whereby said number is stored in 7421 binary code and said second plurality of resistors is scaled in the ratio 8–4–2–1 for each decimal digit of said digital number whereby said number is stored in 8421 binary code.

10. The converter of claim 8 including means responsive to predetermined numbers stored in said register for removing from said first circuit means a selected one of said resistors.

References Cited by the Examiner

Pages 137–138, December 1959, IBM Technical Disclosure Bulletin, vol. 2, No. 4.

MALCOLM A. MORRISON, *Primary Examiner.*